United States Patent [19]
Malcomson

[11] Patent Number: 5,984,496
[45] Date of Patent: Nov. 16, 1999

[54] LIGHTED MIRROR ASSEMBLY

[76] Inventor: Kirk Malcomson, 25287 E. Huron River Dr., Flat Rock, Mich. 48134

[21] Appl. No.: 08/966,346

[22] Filed: Nov. 7, 1997

Related U.S. Application Data

[60] Provisional application No. 60/030,004, Nov. 7, 1996.

[51] Int. Cl.⁶ .................................................. B60Q 1/00
[52] U.S. Cl. ...................... 362/494; 362/492; 362/540; 362/135
[58] Field of Search .................................. 362/494, 540, 362/541, 542, 135, 142, 492

[56] References Cited

U.S. PATENT DOCUMENTS

| | | | |
|---|---|---|---|
| 1,938,105 | 12/1933 | Johnson . | |
| 2,580,014 | 12/1951 | Gazda | 362/494 |
| 4,371,235 | 2/1983 | Locke, Sr. | 350/280 |
| 4,646,210 | 2/1987 | Skogler et al. | 362/142 |
| 4,821,019 | 4/1989 | Taylor | 362/494 |
| 5,017,903 | 5/1991 | Krippelz, Sr. | 340/472 |
| 5,059,015 | 10/1991 | Tran | 359/844 |
| 5,069,538 | 12/1991 | Shust et al. | 359/871 |
| 5,303,130 | 4/1994 | Wei et al. | 362/494 |
| 5,303,205 | 4/1994 | Gauthier et al. | 367/108 |
| 5,624,176 | 4/1997 | O'Farrell et al. | 362/83.1 |

*Primary Examiner*—Stephen Husar
*Attorney, Agent, or Firm*—Weintraub & Brady, P.C.

[57] ABSTRACT

A mirror assembly, such as is used for school busses and similar vehicles, includes a mirror head including a mirror surface and a housing. The mirror surface and the housing define a hollow interior. A light bulb is provided in the hollow interior. The housing is translucent so light from the bulb can be seen outside the housing. The light bulb can be electrically connected to various elements of the vehicle's electrical system, such as turn signals, flashers, and/or headlights.

11 Claims, 1 Drawing Sheet

LIGHTED MIRROR ASSEMBLY

CROSS-REFERENCE TO RELATED APPLICATION

This application is a completion application of provisional application Ser. No. 60/030,004, for "LIGHTED MIRROR ASSEMBLY," filed Nov. 7, 1996, the disclosure of which is incorporated by reference.

REFERENCE TO MICROFICHE APPENDIX

Not applicable.

STATEMENT REGARDING FEDERALLY SPONSORED RESEARCH OR DEVELOPMENT

Not applicable.

BACKGROUND OF THE INVENTION

1. Field of the Invention

The present invention pertains to mirror assemblies. More particularly, the present invention pertains to vehicular mirror assemblies. Even more particularly, the present invention pertains to vehicular mirror assemblies including means for illuminating.

2. Prior Art

The present invention is directed to a mirror assembly for use, primarily, with vehicles such as trucks, busses, and the like. The present invention has particular utility in association with transportation vehicles, such as school busses and the like. Typically, school busses have exterior mirrors mounted onto the front fender, or in proximity thereto, to enable the driver to have a field of view extending both downwardly and forwardly of the front end of the vehicle to ensure a viewing of any activity thereabout. Because these mirrors are exterior to the vehicle, they are viewable by persons in other vehicles and by pedestrians as well as by the driver of the vehicle.

Vehicles, especially large vehicles such as school busses, are required in most, if not all, jurisdictions to have exterior lights as a safety feature. Vehicles are also required to have rear-view mirrors. The present invention enhances safety by providing lights in exterior mirrors, which can work either independently or in conjunction with any other exterior lights the vehicle may have. The present invention can, similarly, be used in conjunction with interior mirrors.

BRIEF SUMMARY OF THE INVENTION

The present invention provides a lighted mirror assembly comprising:
(a) a mirror head, the mirror head comprising:
   (1) a housing, the housing formed of a translucent material, and
   (2) a mirror surface, the housing and the mirror surface cooperating to define a hollow interior;
(b) means for illuminating the mirror head, the means for illuminating disposed within the hollow interior; and
(c) means for actuating the means for illuminating, the means for actuating in electrical communication with the means for illuminating.

The present lighted mirror assembly is, preferably, used as a mirror assembly for a vehicle. Typically, a vehicular mirror assembly includes a shaft to which the mirror head is mounted as well as a mounting assembly.

The means for illuminating, such as a light bulb, is disposed within the interior of the mirror head, so light can be seen through the translucent housing. The means for actuating the means for illuminating includes an electric socket disposed at least partially within the mirror head, to which the means for illuminating is secured, the socket being in electrical communication with an electrical system of the vehicle.

The means for actuating can be wired into the electric system of the vehicle at a variety of points, including the turn signal circuit, the headlamp circuit, or the vehicle's battery directly.

For a more complete understanding of the present invention, reference is made to the following detailed description and accompanying drawings. In the drawings, like reference characters refer to like parts through the several views, in which:

DETAILED DESCRIPTION OF THE INVENTION

Figure 1:
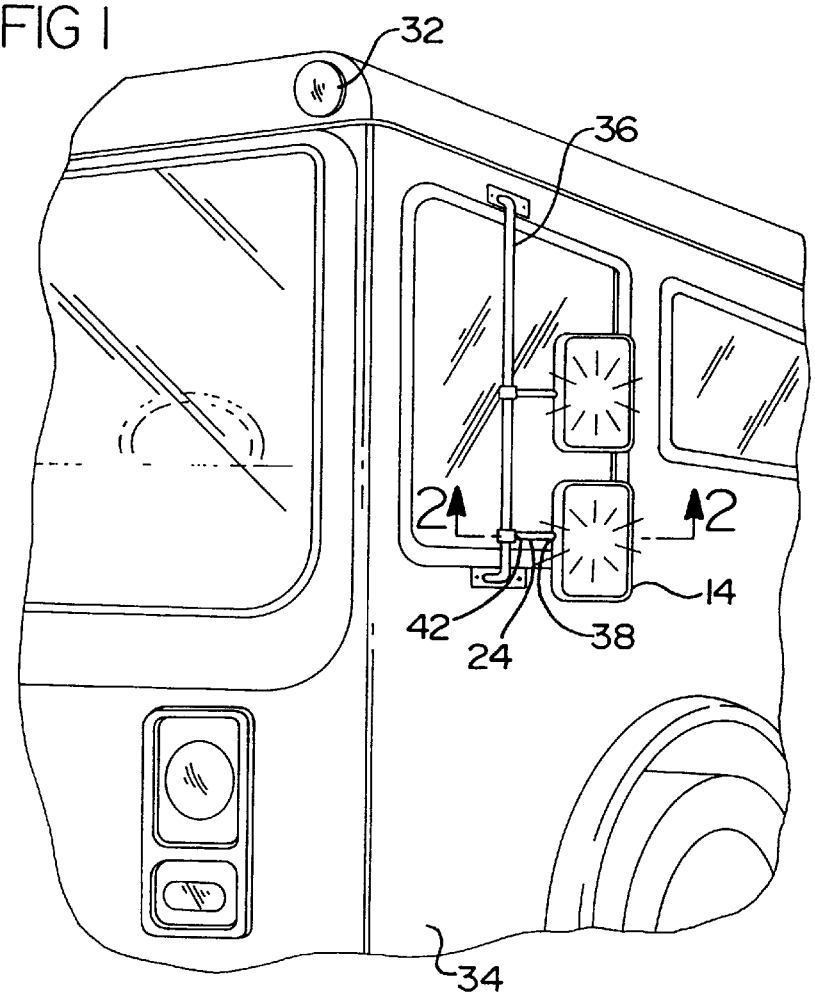
FIG. 1 is a partial perspective view of a vehicle having a mirror assembly in accordance with the present invention mounted thereonto.
Figure 2:
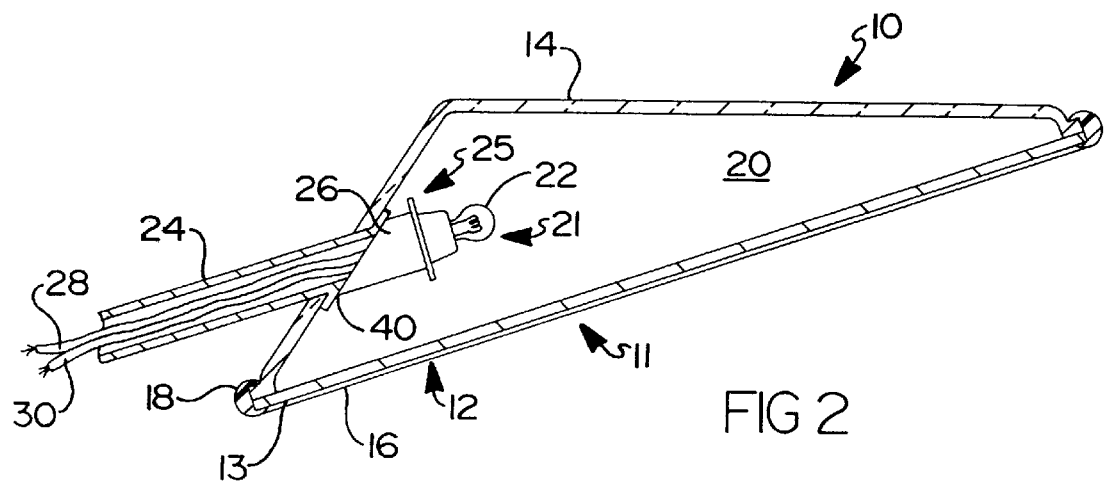
FIG. 2 is a cross-sectional view taken along line 2—2 of FIG. 1.

Now, and with reference to the drawing, there is depicted therein a lighted mirror assembly in accordance with the present invention and, generally, denoted at 10.

The present lighted mirror assembly is, preferably, used as an exterior mirror assembly for a school bus or like vehicle. Typically, such an exterior vehicular mirror assembly includes a shaft, such as is depicted at 24, to which a mirror head, such as is depicted at 11, is mounted, as well as a mounting assembly, such as is depicted at 36. In the practice of the present invention, the type of shaft, the type of mount, and the type of mirror are not critical hereto. Indeed, any type of mirror head can be used in the present invention, except that the mirror head has a hallow interior. However, for purposes of illustrating the present invention, a typical exterior school bus mirror, such as that described in U.S. Pat. No. 4,830,326, is used. It is to be understood, though, that the present invention is not restricted to that specific type of mirror head. Moreover, although the present invention is depicted with reference to a window mounted mirror assembly, it is to be understood that fender mounted mirrors such as that shown in U.S. Pat. No. 4,938,578, the disclosure of which is incorporated by reference, and other types of vehicle mirrors, both interior mirrors and exterior mirrors, are amenable hereto.

As shown in the drawing, the mirror head 11 of the type contemplated for use herein, generally, includes a reflective mirror surface or mirror 12 and a housing 14. The mirror 12 may be formed from any suitable material, such as glass, plastic, or the like, which has a reflective surface 16 deposited thereon. Typically, the mirror 12 is an opaque surface 13 onto which the reflective surface 16, which is usually a silver surface, is deposited by any suitable technique. The actual formation of the mirror, per se, is not critical hereto.

The housing 14 is a thin-walled member used to support the mirror 12. Usually, in fabricating mirror heads of the type contemplated for use herein, the housing is formed from a sturdy metal or the like. Contrariwise, and in accordance with the present invention, the housing 14 is fabricated from a translucent material such as a plastic. Suitable translucent plastics include polycarbonate, high density polyethylene, and the like. Such plastic materials may include ultraviolet light inhibitors, etc. It is to be understood with respect hereto that: the specific type of plastic employed for the manufacture of the housing 14 is not critical hereto. The criticality attached hereto is that the housing 14 be translucent. The translucent material may be clear, i.e. transparent, or colored.

As shown, the housing 14 and the mirror 12 cooperate to define a hollow interior 20. Ordinarily, a gasket 18 is used to securely hold the mirror to the housing. The housing 14 has an aperture 38 formed therethrough which is used to mount the mirror head 11 to the shaft 24, as detailed below.

Means for illuminating 21, which is used to illuminate the mirror head 11, and particularly housing 14. The means 21 may be a light bulb 22 or the like and is disposed within the interior 20 at any convenient spot therewith.

As shown in the drawing, the mirror shaft 24, to which the mirror head 11 is mounted via any convenient means for mounting, such as bolts, clamps, or the like, partially extends into the interior 20 through the aperture 38. The shaft has a first end 40 and an opposed second end 42. The shaft extends between the mounting assembly 36 and the mirror head 11, as shown. The second end 42 is attached to the mounting assembly 36 by any convenient means, such as bolts, clamps, or the like of the type well known in the art. For convenience, the means for illuminating 21 is seated upon the first end of the shaft 24. Alternate modes for mounting the means for illuminating 21 may be included, although not shown. For example, the means for illuminating 21 may be mounted by the disposition of a suitable mounting bracket within the interior 20, or the like.

It is to be appreciated that when the means for illuminating 21 is actuated, then, the light emitted thereby is transmitted through the translucent housing. By selecting a light bulb or other device of suitable wattage or lumens, a lighting signal may then be provided such as to approaching traffic, or the like.

Referring, again, to the drawing, the present invention further includes means for actuating 25. The means 25 actuals the means for illuminating 21. The means for actuating 25 comprises an electric socket 26, lead wires 28, 30 extending from the socket 26 and a suitable source of power, such as the vehicle battery or ignition switch (not shown). The electrical socket 26 is, preferably, disposed atop and within the shaft 24 at the free end thereof. Preferably, the means for illuminating 21 is electrically connected to the fuse box of the vehicle 34, and derives its power from a vehicle battery (not shown).

A suitable switch (not shown) may be interposed in the circuit to turn the means for illuminating 21 "on" and "off" in a manner well known to the skilled artisan.

In a particularly preferred embodiment of the present invention, the means for illuminating 21 is electrically connected to a flasher system 32 of the vehicle 34. Usually, school busses and similar vehicles have flashing light systems 32 associated therewith which are actuated by the driver to signal surrounding traffic that the school bus is stopped. By placing the means for illuminating 21 in electrical communication with the flashing light system, then, when the flashing system is actuated, likewise, the means for illuminating 21 is so actuated and begins to illuminate. Of course, it is possible to impose an RC circuit intermediate of the means for illuminating 21 so that it "flashes". Such circuitry and wiring are well-known to the skilled artisan.

It is, also, contemplated in the practice of the present invention that the means for illuminating 21 be directly wired into the turn signal switch of the vehicle so that when the turn signal is activated, simultaneously and concomitantly therewith, the means for illuminating 21 is actuated. Again the actual circuitry for achieving this is well known to the skilled artisan.

It is further contemplated in the practice of the current invention, and as is well known to the skilled artisan, that when associated with a school bus or similar vehicle 34 and the like, exterior fender mounted vehicular mirror assemblies of the type contemplated for use herein are mounted in pairs, one on the driver's side and one on the passenger side, each having a mirror head, a mirror shaft, and means for mounting. Thus, it is contemplated that when the flashers of the school bus are actuated, then, both mirror heads are illuminated. Likewise, when the left hand turn signal is actuated, then, the means for illuminating 21 on the left hand mirror is actuated, and conversely, when the right hand turn signal is actuated, then, the means for illuminating 21 on the right hand mirror is actuated.

It is, also, possible to define the means for illuminating 21 as a two-way or three-way light bulb, thus providing more than one degree of illumination, the degree of illumination being directly related to the resistance of the filament. Thus, it is possible to connect the bulb to the electrical system of the vehicle such that when the headlamps are actuated, so too are the means for illuminating 21 actuated.

In order to properly diffract the light rays, a shield or similar diffraction member 50 may be disposed within the interior of the housing 14 to dissipate the light rays over the entire housing 14 to provide a more evenly distributed light. Alternatively, in lieu of the shield, coated light bulbs may be used.

It is to be appreciated from the preceding that, when deployed in connection with a school bus or similar vehicle, the present lighted mirror assembly provides further enhanced safety and warning to approaching traffic that the vehicle is either turning or has come to a stop.

While the invention has been illustrated and described in detail in the drawings and the foregoing description, the same is to be considered as illustrative and not restrictive in character, it being understood that only the preferred embodiment, has been shown and described fully and that all changes and modifications that come within the spirit of the invention are desired to be protected.

Having, thus, described the invention, what is claimed is:

1. A lighted mirror assembly, comprising:
   (a) a mirror head, the mirror head comprising:
      (1) a housing formed of a translucent material,
      (2) a mirror surface, the housing having a hollow interior;
   (b) means for illuminating, the means for illuminating disposed within the hollow interior and emitting light;
   (c) means for diffusing disposed within the hollow interior to distribute emitted light evenly over the housing, and
   (d) means for actuating the means for illuminating, the means for actuating in electrical communication with the means for illuminating.

2. The lighted mirror assembly of claim 1 wherein the translucent material is a plastic material.

3. The lighted mirror assembly of claim 1 wherein the means for illuminating is a light bulb.

4. The lighted mirror assembly of claim 3 wherein the light bulb is illuminable at more than one degree of illumination.

5. The lighted mirror assembly of claim 1 wherein the housing has an aperture formed therethrough, and further comprising a shaft and means for mounting, the shaft having a first end, the mirror head mounted on the shaft by the means for mounting, the first end of the shaft projecting into the interior of the housing through the aperture in the housing.

6. The lighted mirror assembly of claim 5 wherein the means for actuating comprises an electric socket, in electrical communication with a source of power.

7. The lighted mirror assembly of claim 1 wherein the means for actuating is in electrical communication with an electric system of a vehicle.

8. The lighted mirror assembly of claim 1 wherein the means for actuating is in electrical communication with a turn signal switch of a vehicle.

9. The lighted mirror assembly of claim 1 wherein the means for actuating is in electrical communication with a headlamp electrical system of a vehicle.

10. The lighted mirror assembly of claim 1 which comprises:

a shield disposed in the housing, the shield defining the means for diffusing.

11. The lighted mirror assembly of claim 3 wherein the light bulb is a coated light bulb, the coating thereof defining the means for diffusing.

* * * * *